H. F. Shaw,
Hand Saw,
N° 39,330.            Patented July 21, 1863.
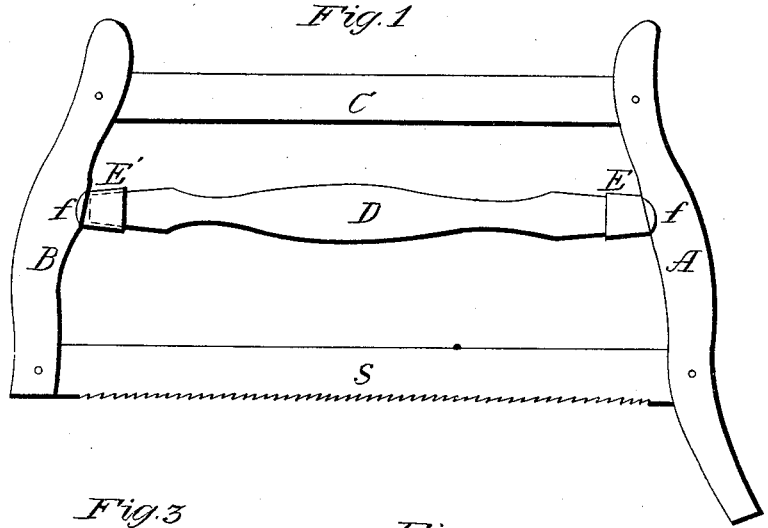
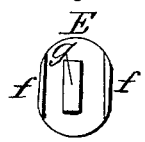
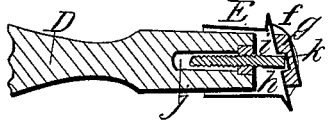
Witnesses
N. Ames.
George Griggs.
Inventor:
Henry F. Shaw

UNITED STATES PATENT OFFICE.

HENRY F. SHAW, OF WEST ROXBURY, MASSACHUSETTS.

IMPROVEMENT IN WOOD-SAW FRAMES.

Specification forming part of Letters Patent No. 39,330, dated July 21, 1863.

*To all whom it may concern:*

Be it known that I, HENRY F. SHAW, of West Roxbury, in the county of Norfolk and State of Massachusetts, have invented a new and useful Improvement in Wood-Saw Frames; and I do hereby declare that the following is a full, clear, and exact description of the construction and operation of the same, reference being had to the accompanying drawings, forming a part of this specification, in which—

Figure 1 is a side view of the frame and saw; Fig. 2, a longitudinal central section through one end of the pressure bar D, the thimble E, screw $h$, and nut $i$; and Fig. 3 is a view of the outer end of one of the thimbles.

Like parts are indicated by the same letters in all the drawings.

The nature of my invention consists, first, in combining with the three parts A, B, and C of a common wood-saw frame a revolving pressure-bar, D, provided with a nut, $i$, and screw $h$, operating substantially as hereinafter described; second, in constructing the thimble E with lateral flanges $f$, and a central tenon, $g$, to hold it in place on the frame, and a mortise, $k$, in the bottom of the thimble, to receive the head of the screw $h$ and keep it from turning.

To enable others skilled in the art to make and use my improvement, I will now proceed to describe its construction and operation.

The end pieces, A and B, of the frame are made of wood, and shaped like those in general use. The top piece, C, is also made of wood, its extremities entering suitable mortises in the tops of A and B, in which they are confined by pins. The saw S is also confined in the frame in the usual manner. The pressure-bar D is round, made of wood, and shaped as shown in Fig. 1. In one end of the bar D, as represented in Fig. 2, is a round hole, $j$, to admit the screw-bolt $h$, and $i$ is a square nut embedded in the end of D, and provided with a female screw for the reception of the screw-bolt $h$, the head of which is square or rectangular, so as to fit into the mortise $k$ in the bottom of the thimble E, whereby the screw is prevented from turning. The thimbles E E' are made of brass, iron, or other suitable metal, and shaped as shown in the drawings. On each side of the bottom of the thimble is a flange, $f$, the distance between the two flanges being the thickness of the two end pieces, A and B, of the frame, so as to clasp the latter, as shown in Fig. 1.

$g$ is a tenon on the bottom of the thimble, as represented in Figs. 2 and 3, which enters a corresponding mortise in the frame, whereby said thimble is prevented from slipping up or down. In the bottom of the thimble is a square or rectangular mortise, to receive the head of the screw $h$ and prevent the latter from turning. One end of the bar D turns on the bottom of the thimble E', as shown in Fig. 1. The other end, provided with the nut $i$ and screw $h$, also turns in the thimble E, as shown in Fig. 2, by which it is completely concealed, as well as kept from dust and moisture. By turning the bar D in one direction it is obvious that the tension of the saw will be increased, and by turning the same in the opposite direction the tension of the saw will be diminished.

The frame thus constructed is very neat in appearance, simple in construction, cheap, durable, and efficient.

Having thus described the nature and construction of my improvement, what I claim as new, and desire to secure by Letters Patent, is—

1. Combining with the three parts A, B, and C of a common wood-saw frame a revolving pressure-bar, D, provided with a nut, $i$, and screw $h$, or their equivalents, substantially as described, and for the object specified.

2. The thimble E, provided with lateral flanges $f f$, tenon $g$, and mortise $k$, to operate in combination with the ends of the frame A and B, the bar D, and its appendages, substantially as and for the purpose described.

HENRY F. SHAW.

Witnesses:
N. AMES,
N. EVANS, Jr.